United States Patent
Duelli et al.

(10) Patent No.: US 6,994,311 B2
(45) Date of Patent: Feb. 7, 2006

(54) REGULATING VACUUM VALVE

(75) Inventors: Bernhard Duelli, Uebersaxen (AT); Leo Marugg, Sennwald (CH); Robert Gsteu, Feldkirch (AT)

(73) Assignee: VAT Holding AG, Haag (CH)

( * ) Notice: Subject to any disclaimer, the term of this patent is extended or adjusted under 35 U.S.C. 154(b) by 213 days.

(21) Appl. No.: 10/607,621

(22) Filed: Jun. 27, 2003

(65) Prior Publication Data

US 2004/0262564 A1 Dec. 30, 2004

(51) Int. Cl.
*F16K 31/02* (2006.01)

(52) U.S. Cl. ............... 251/129.11; 251/266; 251/294; 251/339; 137/219

(58) Field of Classification Search .......... 251/339, 251/248, 266, 129.11, 129.12, 294; 74/424.71; 137/219, 220, 221, 222; 415/90
See application file for complete search history.

(56) References Cited

U.S. PATENT DOCUMENTS

| | | | |
|---|---|---|---|
| 1,699,217 A | 1/1929 | Wilson | |
| 2,878,827 A | * 3/1959 | Johnson et al. | 137/219 |
| 4,577,654 A | 3/1986 | Pringle | |
| 4,749,000 A | * 6/1988 | Ring et al. | 137/219 |
| 5,172,722 A | * 12/1992 | Nishimura | 137/599.16 |
| 5,873,562 A | 2/1999 | Marugg | |
| 6,325,096 B1 | 12/2001 | Rising et al. | |

FOREIGN PATENT DOCUMENTS

DE  34 22 589  12/1985

* cited by examiner

*Primary Examiner*—Edward K. Look
*Assistant Examiner*—John K. Fristoe, Jr.
(74) *Attorney, Agent, or Firm*—Reed Smith LLP

(57) ABSTRACT

A regulating vacuum valve comprises a valve body with a through-channel a closure member which is adjustable over a control path between a closed position of the regulating vacuum valve in which it contacts a valve seat and closes the through-channel and an open position of the regulating vacuum valve in which it is raised from the valve seat, an adjusting device which has a drive unit for adjusting the closure member over the control path, a carrying unit which carries the closure member and is supported so as to be displaceable relative to the closure member. The carrying unit is arranged in the through-channel and is secured to the valve body, and the carrying unit has a chamber which is sealed relative to the through-channel and in which the adjusting device or at least a portion thereof is arranged.

22 Claims, 8 Drawing Sheets

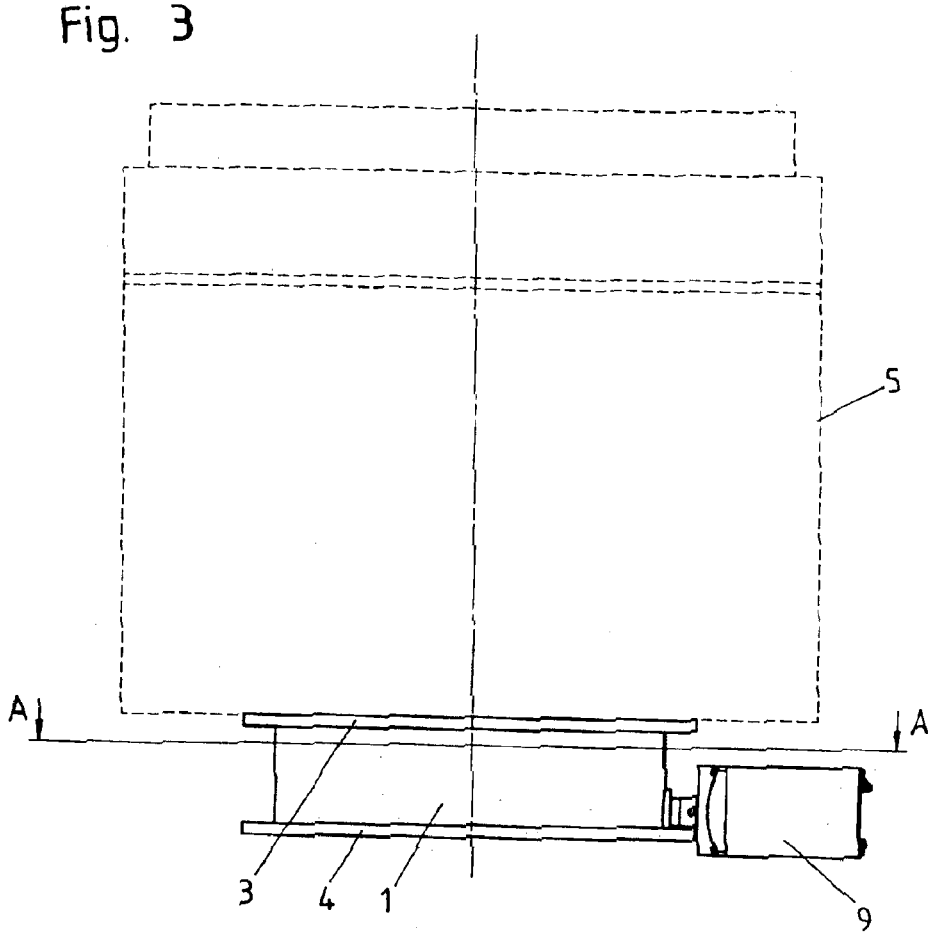
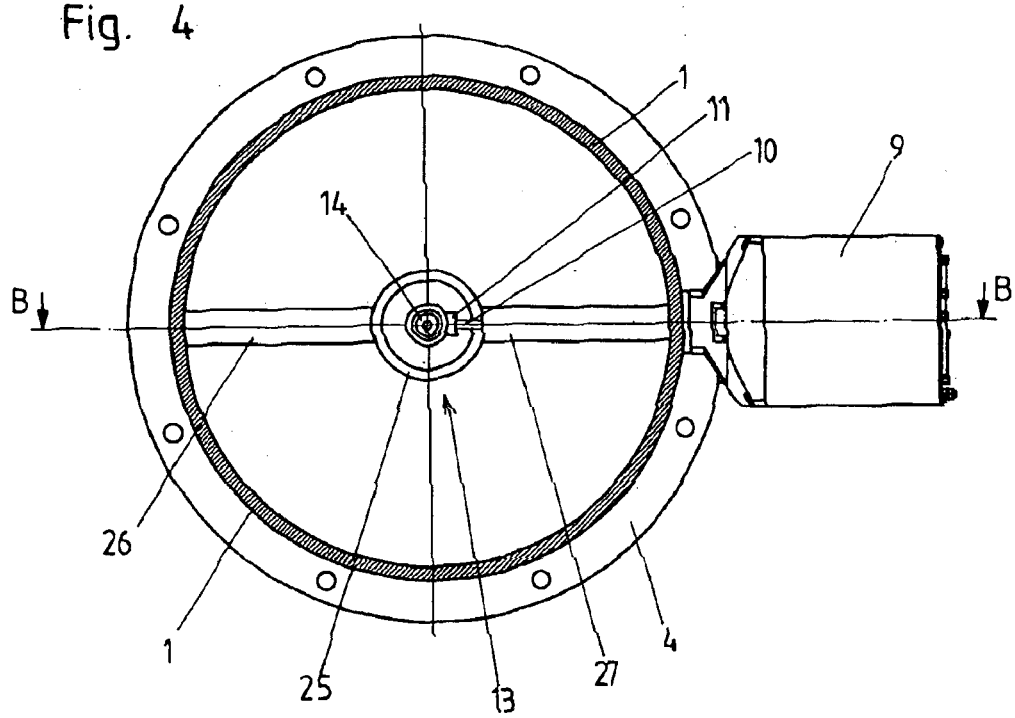

REGULATING VACUUM VALVE

BACKGROUND OF THE INVENTION a) Field of the Invention

The invention is directed to a regulating vacuum valve. More precisely, the invention is directed to a regulating vacuum valve comprising a valve body with a through-channel, a closure member which is adjustable over a control path between a closed position in which it contacts a valve seat and closes the through-channel and an open position in which it is raised from the valve seat, and an adjusting device which has a drive unit and adjusts the closure member over the control path.

b) Description of the Related Art

There are different known embodiment forms of regulating vacuum valves. For example, U.S. Pat. No. 5,873,562 shows a vacuum regulating valve in which the plate-shaped closure member is displaceable perpendicular to the axis of the through-channel penetrating the valve body. The plate-shaped closure member is swiveled around an axis extending parallel to the axis of the through-channel. This swiveling is carried out in the plane of the plate-shaped closure member. The through-channel is covered to a greater or lesser extent by the closure member for regulating the flow through the through-channel. The valve also has a completely sealed state in which the closure member completely covers the through-channel and an annular sealing member which is mounted so as to be displaceable in the through-channel is adjusted to the closure member.

Since the orifice opened in the regulating area is not symmetric to the axis of the through-channel in this regulating vacuum valve, the gas flow through the valve is asymmetric, which is undesirable in various applications such as in semiconductor technology.

U.S. Pat. No. 6,325,096 B1 shows and describes a regulating valve, including embodiment examples which allow a symmetric flow. For this purpose, band-shaped or plate-shaped parts are moved simultaneously, so that the cross section of the through-channel is made narrower from opposite sides simultaneously and the remaining passage opening is symmetric to the axis of the through-channel. Among the disadvantages of this valve are the parts which are moved simultaneously and which narrow the passage opening and the relatively large constructional size of the valve (considered in the direction vertical to the axis of the passage opening). Also, this valve has no sealed state.

Further, corner valves in which the through-channel through the valve body is bent by 90° are known. The closure member is arranged at a rod which is supported so as to be displaceable in the valve body and which is guided out of the valve body along a sealed displacement leadthrough. The actuating unit for displacing the rod and closure member arranged on the rod is arranged outside the valve body. A corner valve of this kind is described, for example, in DE-OS 34 22 589.

In the valve shown in U.S. Pat. No. 1,699,217, the through-channel through the valve body is also not straight; rather, it is extends in a curved or bent manner through an inner wall of the valve body arranged at an angle to the axis of the inlet opening and outlet opening of the valve body. This inner wall has a passage opening which can be closed and opened by the closure member. The closure member is secured to a rod which again is guided out of the valve body through a displacement leadthrough. The valve can be opened and closed by means of a hand wheel which is arranged outside the valve body.

U.S. Pat. No. 4,577,654 discloses a pipeline valve in which the through-channel penetrates the valve body in a straight line. A valve seat is arranged in the through-channel and a closure member can be adjusted toward this valve seat in the closed state of the valve. For this purpose, two rods are arranged laterally at the closure member and parallel to the axis of the through-channel and penetrate a bore hole in the valve body through a displacement leadthrough. Pistons which are displaceable in cylinder spaces arranged in the valve body are fastened to the other ends of these rods. These cylinder spaces lie in an area of the valve body surrounding the through-channel. This valve has only a completely open and completely closed state. Accordingly, it is not a regulating valve.

OBJECT AND SUMMARY OF THE INVENTION

One object of the invention is to provide a regulating vacuum valve in which there is a symmetric flow in the completely open state and partially open state.

Another object of the invention is to provide a regulating vacuum valve which is simple and economical to manufacture.

Another object of the invention is to provide a regulating vacuum valve which has an advantageous regulating behavior.

Another object of the invention is to provide a regulating vacuum valve which also has a sealed state.

A regulating vacuum valve, according to the invention, comprises a valve body with a through-channel, a closure member which is adjustable over a control path between a closed position of the regulating vacuum valve in which it contacts a valve seat and closes the through-channel and an open position of the regulating vacuum valve in which it is raised from the valve seat, an adjusting device which has a drive unit and adjusts the closure member over the control path, a carrying unit which carries the closure member and is supported so as to be displaceable relative to the closure member, wherein the carrying unit is arranged in the through-channel and is secured to the valve body, and wherein the carrying unit has a chamber which is sealed relative to the through-channel and in which the adjusting device or at least a portion thereof is arranged.

In a regulating vacuum valve of this kind, a symmetric flow is achieved in the completely open state of the valve as well as in the partially open state of the valve. Also, a sealed state of the regulating vacuum valve can be provided. The valve can have a simple construction and be compact.

Further advantages and details of the invention will be described in the following with reference to the embodiment examples shown in the drawings, further objects of the invention following therefrom.

BRIEF DESCRIPTION OF THE DRAWINGS

FIG. 3 is a side view of the valve showing schematically in dashes a vacuum chamber to which the valve is connected;

FIG. 4 shows a cross section along line A—A from FIG. 3;

DESCRIPTION OF THE PREFERRED EMBODIMENT EXAMPLES

Figure 1:
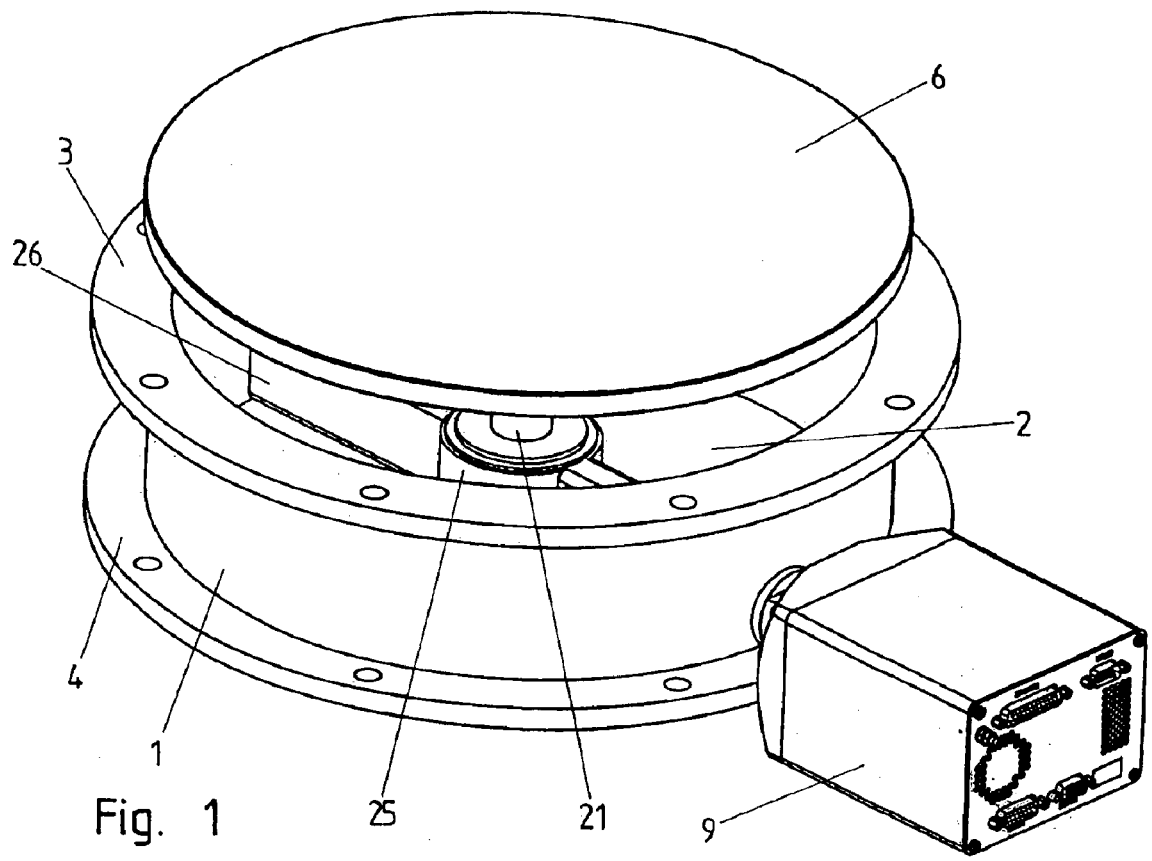
FIG. 1 is a perspective view of a first embodiment example of a regulating vacuum valve according to the invention.
Figure 2:
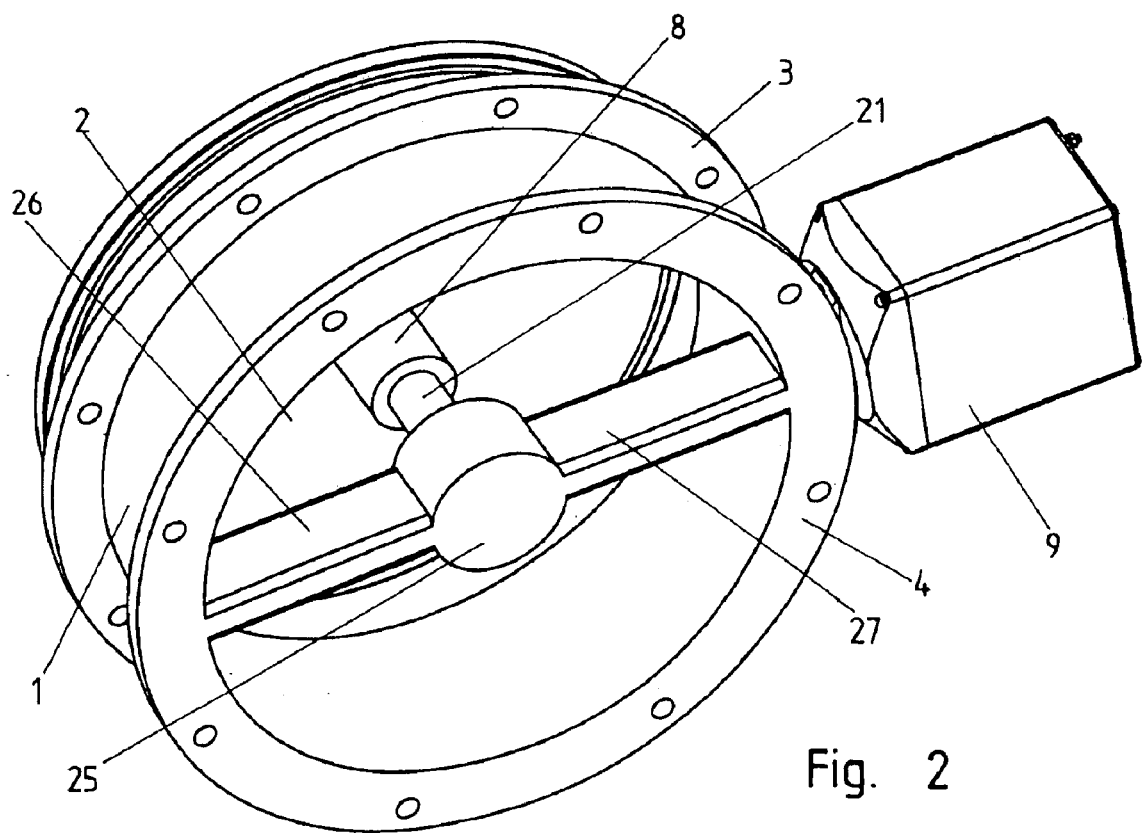
FIG. 2 is a perspective oblique view of the valve from FIG. 1.
Figure 5:
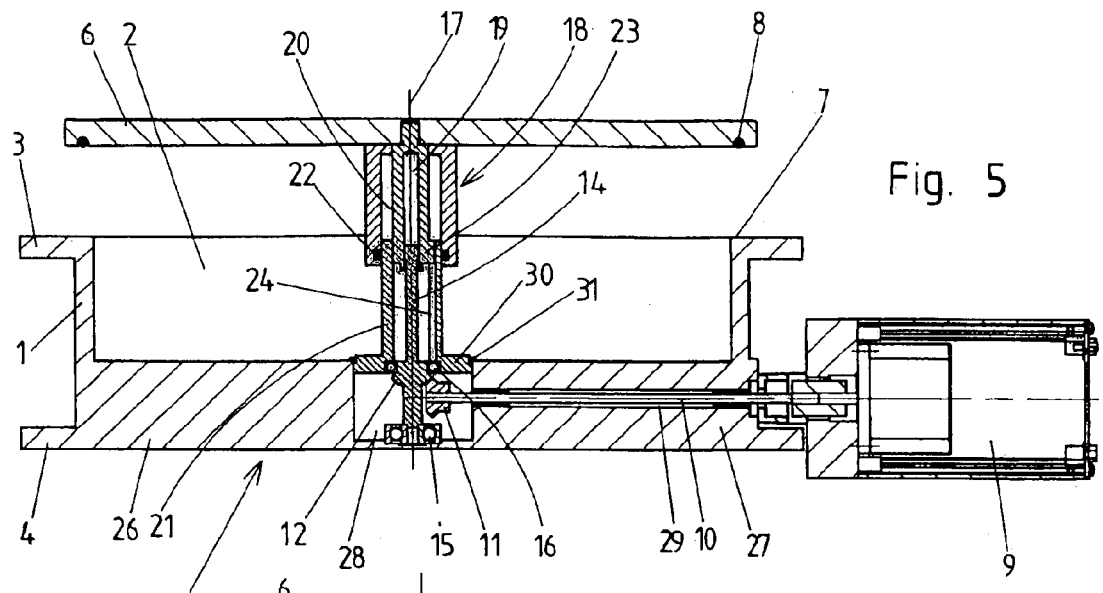
FIG. 5 shows a longitudinal central section along line B—B of FIG. 4 in the completely open state of the valve.
Figure 6:
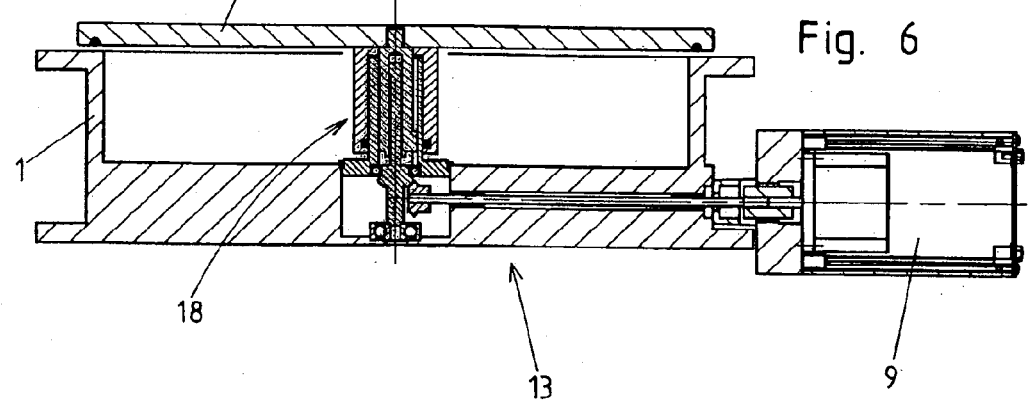
FIG. 6 shows a section corresponding to FIG. 5 but in a partially open state (a regulating state) of the valve.
Figure 7:
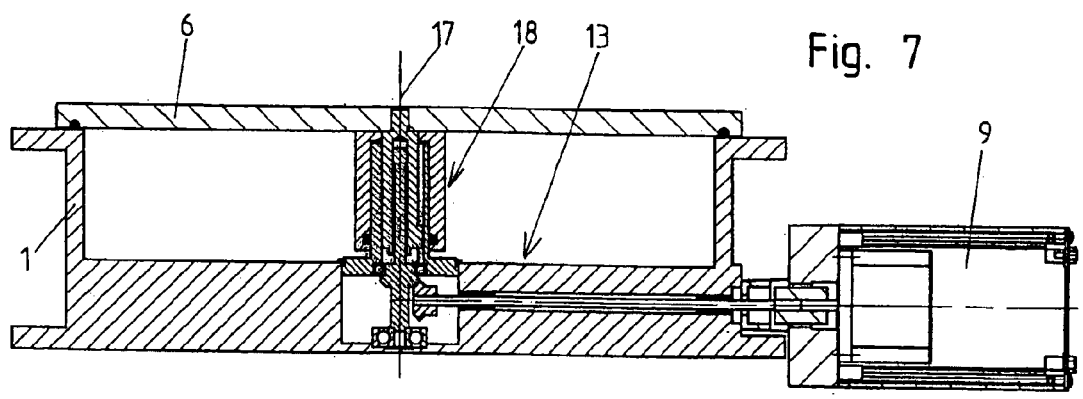
FIG. 7 shows a section corresponding to FIG. 5, but in the completely closed, i.e., sealed, state of the valve.

A first embodiment example of a regulating vacuum valve according to the invention is shown in FIGS. 1 to 7. The valve has a valve body 1 which has a through-channel 2. The valve body 1 is formed by a cylindrical pipe piece which is provided with annular flanges 3, 4 at its two ends which form the inlet opening and outlet opening of the through-channel 2 extending in a straight line. The valve body 1, for example, can be arranged at, i.e., flanged to, a vacuum chamber 5 on one side and a pump, not shown in the drawing, on the other side.

The valve further comprises a plate-shaped closure member 6 which is adjustable between a completely closed position (FIG. 7) and a completely open position (FIG. 5) of the valve. In the completely closed position, the closure member 6 contacts a valve seat 7 which is arranged at the valve body 1 in this embodiment example, specifically, at a front end thereof. An elastic sealing ring, for example, a Viton® ring of the closure member 6, is pressed against a sealing surface arranged at the valve seat 7. It is also conceivable and possible in principle to arrange the sealing ring at the valve seat 7 and the sealing surface at the closure member 6.

Figure 8:
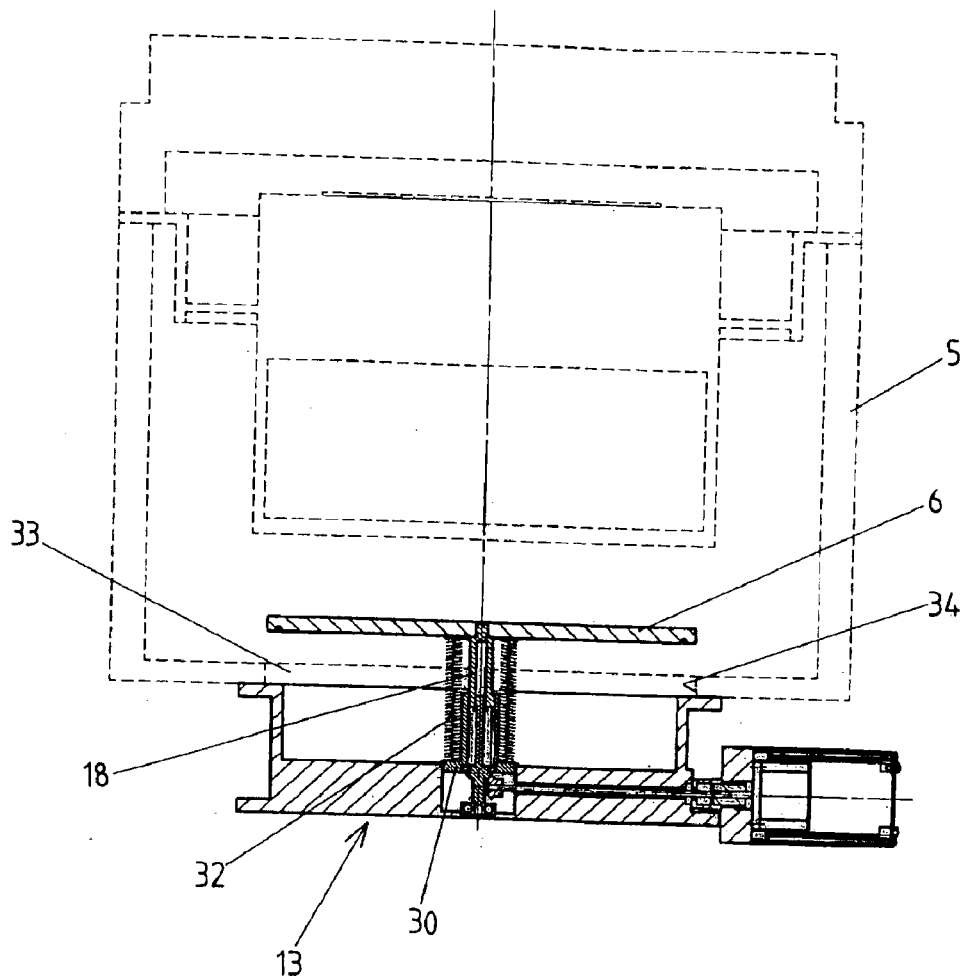
FIG. 8 shows a longitudinal central section through a somewhat modified embodiment form of a regulating vacuum valve, according to the invention, in the completely open state of the valve, wherein a vacuum chamber to which the valve is flanged and an insert contained in the vacuum chamber are shown schematically by dashed lines.
Figure 9:
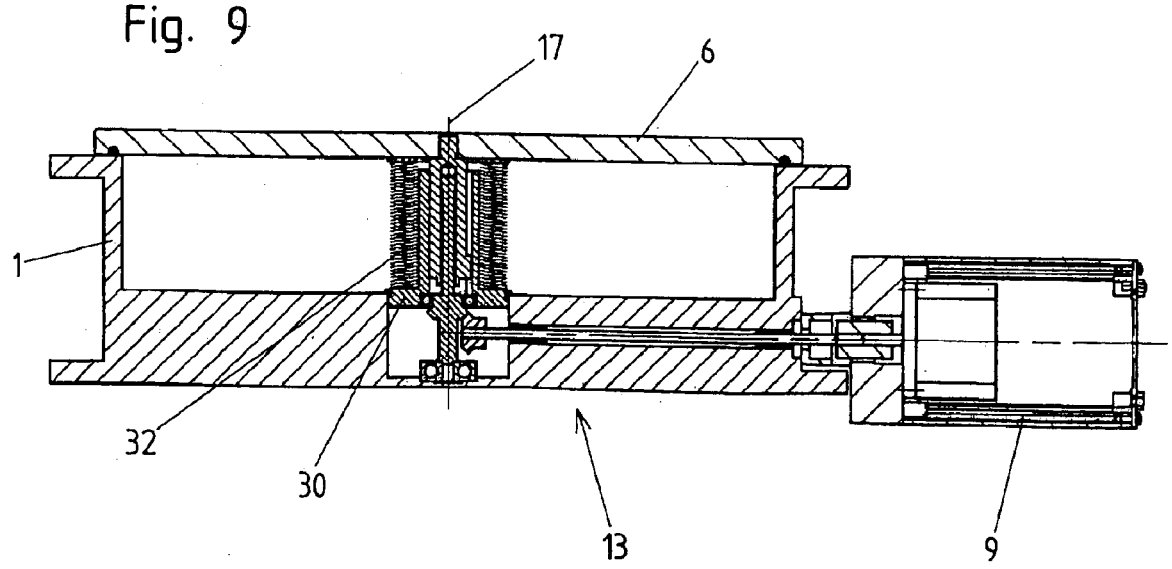
FIG. 9 shows the valve from FIG. 8 in an enlarged view in the completely closed state.

In the completely closed state of the valve, the through-channel 2 is closed in FIGS. 8 and 9 in that the valve seat 7 is arranged at the wall 35 of the vacuum chamber 5. The wall 35 is provided with a sealing surface which cooperates with the sealing ring 8 at the closure member 6. The wall 35 of the vacuum chamber 5 to which the valve body 1 is flanged accordingly forms a portion of the regulating vacuum valve in the area of the valve seat 7 in this embodiment example.

For example, molecular gas flows which occur in the vacuum range from $10^{-6}$ bar or less and which also play a part in the transitional range ($<10^{-3}$ bar) and are characterized by large average free path lengths of the gas molecules can be regulated in an advantageous manner with a valve according to the invention.

In order to adjust the closure member 6 by means of the control path, there is an adjusting device which comprises a drive unit 9 which is formed, for example, by a stepping motor, an AC servomotor or a DC servomotor. The drive unit 9 has an output shaft 10 which can be set in rotation by the drive unit 9, possibly with the intermediary of a gear unit. A pinion 11 which meshes with a pinion 12 of a spindle 14 which is rotatably mounted in a carrying unit 13 is arranged at the end of the output shaft. The rotatable bearing support of the spindle 14 is carried out by means of ball bearings 15, 16. The axis of rotation of the spindle 14 extends parallel to the axis 17 of the through-channel 2 and these two axes coincide in the embodiment example shown in the drawing. The spindle 14 is provided with a male thread along an area adjoining its free end which faces the closure member 6.

A valve rod 18 which extends in axial direction of the through-channel 2 is arranged at the closure member 6. This valve rod 18 has a bore hole 19 proceeding from its free end and extending in axial direction. The bore hole 19 is a pocket hole and is provided with a female thread which cooperates with the male thread of the spindle 14. Further, a recess 20 having a circular ring-shaped cross section is formed in the valve rod. This recess 20 proceeds from the free end of the valve rod in axial direction and encloses the bore hole 19. The carrying unit 13 has a guide connection piece 21 which extends in axial direction of the through-channel 2. This guide connection piece 21 projects into the recess 20 in the valve rod 18, which recess 20 has an annular cross section. An elastic sealing ring 22 which is made of Viton®, for example, is arranged at the radial outer boundary wall of the recess 20, namely, in the vicinity of the free end of the valve rod 18. This sealing ring 22 contacts the outer jacket surface of the guide connection piece 21 and seals the guide connection piece 21 relative to the valve rod 18. Alternatively, the sealing ring could also be arranged at the guide connection piece 21 in the vicinity of its free end and could contact the radial outer wall of the recess 20.

The closure member 6 is supported by the guide connection piece 21 and the recess 20 in the valve rod 18 so as to be displaceable relative to the carrying unit 13. The plate-shaped closure member 6 is mounted so as to be displaceable vertical to its plane and in the direction of the axis 17 of the through-channel 2. The valve rod 18 is outfitted with a projection 23 which projects outward in the area of its free end from the radial inner boundary wall of the recess 20 and which narrows the recess at this location. The projection 23 projects into a groove 24 extending in axial direction of the guide connection piece 21 in the inner wall of the guide connection piece 21. In this way, the closure member 6 is fixed with respect to rotation relative to the valve body 1.

The carrying unit 13 which carries the closure member 6 and is mounted so as to be displaceable relative to it is arranged in the through-channel 2 of the valve body 1 and is fastened to the valve body 1. The carrying unit 13 comprises a carrier body 25 which is arranged centrally in the through-channel 2 and at which fastening webs 26, 27 are arranged by one end at oppositely located positions. At their other ends, the fastening webs 26, 27 are secured to the valve body 1. The through-channel 2 is spanned in this way by the carrying unit 13 which is formed by the carrier body 25, which also has the guide connection piece 21, and by the fastening webs 26, 27 extending in radial direction of the through-channel 2. The carrier body 25, the fastening webs 26, 27 and the valve body 1 are constructed in one piece in the embodiment example shown in the drawing.

The carrying unit 13 has a chamber 28 which is sealed relative to the through-channel 2. One of the fastening webs 26, 27 is provided with a through-hole 29 which opens into the chamber 28 on one side and is continued by a bore hole through the valve body 1 on the other side, opening out into the atmosphere outside the valve body 1. The chamber 28 therefore communicates with the atmosphere via this through-hole 29 and the chamber 28 is accordingly at atmospheric pressure. The output shaft 10 of the drive unit 9 which is located outside the valve body 1 is guided through the through-hole 29 and the bore hole continuing this through-hole through the valve body 1.

The chamber 28 comprises a recess in the carrier body 25. At its end remote of the closure member 6, the guide connection piece 21 has an annular flange 30 which closes the recess in the carrier body 25 with the intermediary of a sealing ring 31. The chamber 28 accordingly further comprises the interior of the guide connection piece 21. Further, the chamber 28 is continued through the bore hole 19 and the recess 20 in the valve rod 18 and is sealed by the sealing ring 22 acting between the valve rod 18 and the guide connection piece 21. In this embodiment example, the adjusting device is formed, as was described, by the drive unit 9 with the output shaft 10 and the rotatably mounted spindle 14. The spindle 14 is an actuating part for adjusting the closure member 6 and cooperates with the female thread of the valve rod 18 arranged at the bore hole 19. Parts of this adjusting device, namely, the front end of the output shaft 10 with the pinion 11 and the spindle 14, are arranged in this chamber 28.

When the output shaft 10 of the drive unit 9 rotates, the spindle 14 is correspondingly set in rotation so that the front end of the spindle 14 is screwed farther into or out of the bore hole 19. In this way, the closure member 6 which is constructed in a plate-shaped manner can be displaced perpendicular to its plane via its control path so that the desired passage cross section of the valve can be adjusted and the completely closed, sealed state of the valve can be occupied.

The control of the drive unit 9 can be carried out in a conventional manner and need not be described in more detail. The state of the valve can also be detected by corresponding position indicator, not shown in the drawings.

The embodiment example shown in FIGS. 8 and 9 differs from the previously described embodiment example in that bellows 32 (e.g., expansion bellows, diaphragm bellows, corrugated bellows, etc.) are provided in this case for sealing the chamber 28 relative to the through-channel 2 of the valve body 1. These bellows 32 are arranged, e.g., welded, in a vacuum-tight manner at the carrying unit 13, e.g., at the annular flange 30, by one end and at the closure member 6 or valve rod 18 by the other end. In this case, the closure member 6 can be fixed with respect to rotation relative to the carrying unit 13 by means of the bellows 32 also. A recess which surrounds the bore hole 19 and which corresponds to the recess 20 in FIGS. 1 to 7 can be dispensed with in this embodiment form. A vacuum chamber 5 to which the valve body 1 can be flanged is indicated schematically in FIG. 8. An opening 33 forming a continuation of the through-channel 2 is arranged in the chamber wall of the vacuum chamber 5. The end of the edge 34 facing the chamber interior forms the control edge for regulating small flow cross sections in the configuration shown herein.

Figure 10:
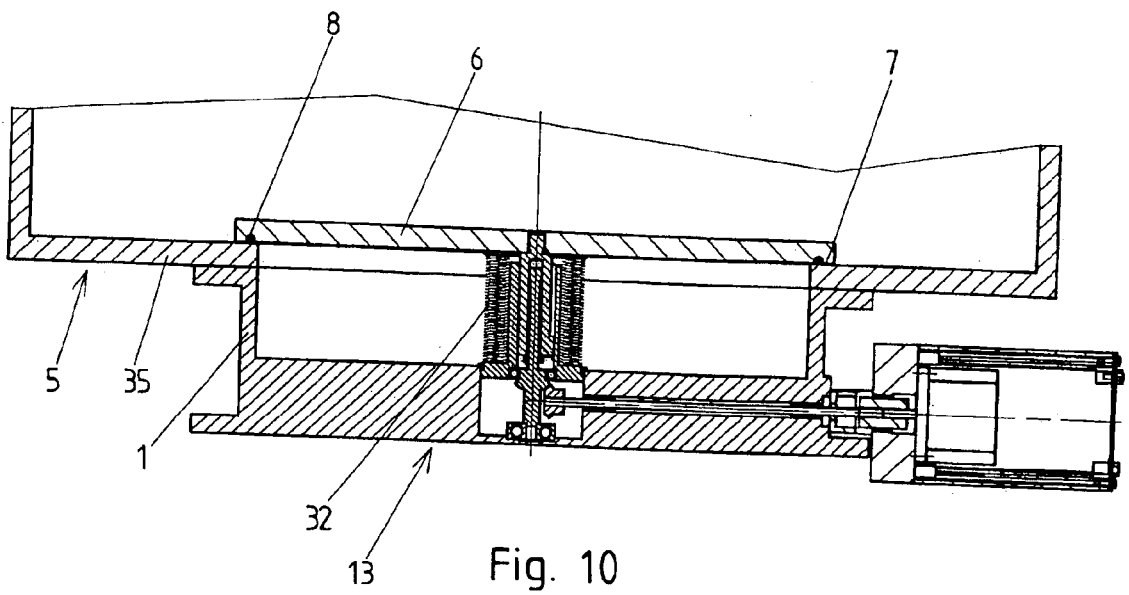
FIG. 10 shows another embodiment form of the valve in longitudinal central section, wherein the valve body is flanged to a vacuum chamber which is only partially shown.

The embodiment example shown in FIG. 10 differs from the embodiment example in FIGS. 8 and 9 in that the valve seat 7 is arranged at the wall 35 of the vacuum chamber 5. The wall 5 is provided with a sealing surface which cooperates with the sealing ring 8 at the closure member 6. The wall 35 of the vacuum chamber 5 to which the valve body 1 is flanged accordingly forms a portion of the regulating vacuum valve in the area of the valve seat 7 in this embodiment example.

Figure 11:
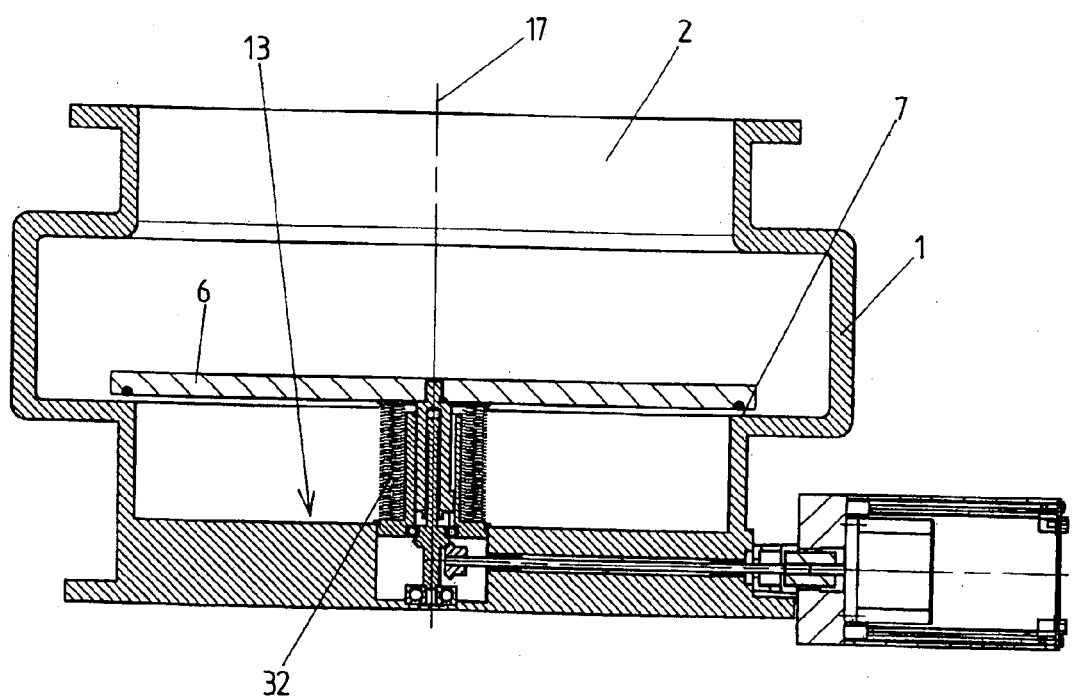
FIG. 11 shows another embodiment form of a regulating vacuum valve, according to the invention, in longitudinal central section.

The constructional variant shown in FIG. 11 differs from the constructional variants shown above in that, in this case, the closure member is arranged inside the through-channel 2 of the valve body 1, namely, in an enlarged portion of this through-channel 2. The valve seat 7 is formed by the valve body 1, specifically by a surface at the edge of the enlarged portion of the through-channel 2, which surface extends vertical to the axis 17 of the through-channel 2.

Figure 12:
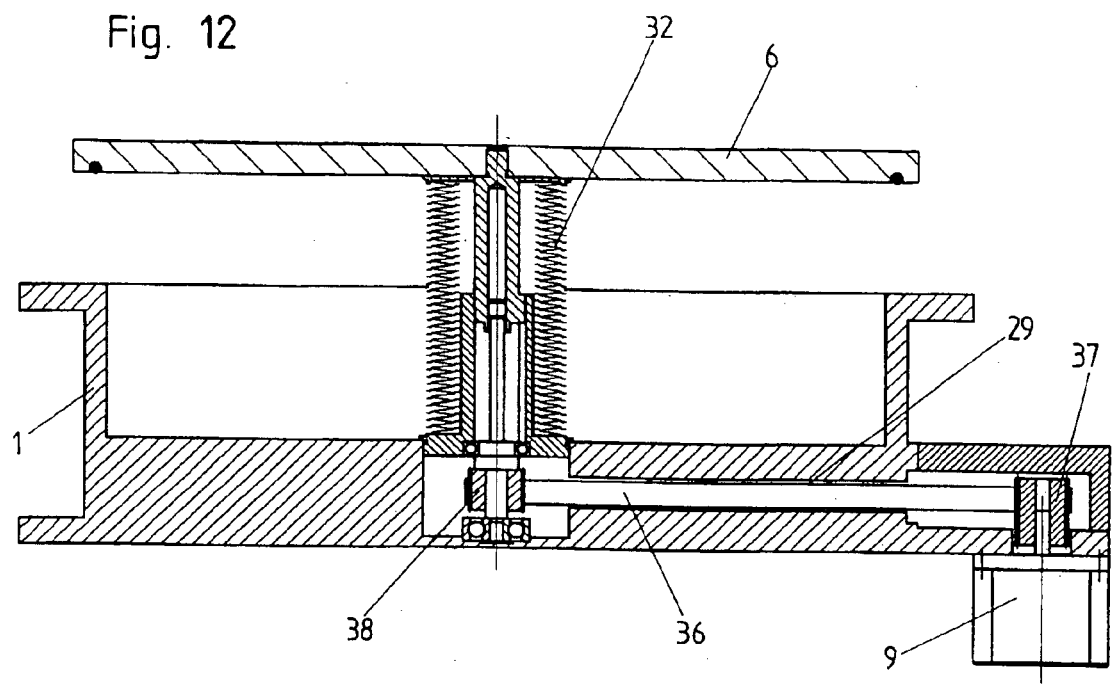
FIG. 12 shows another embodiment form of a regulating vacuum valve, according to the invention, in longitudinal central section.

The constructional variant shown in FIG. 12 differs from the constructional variants in FIGS. 8 and 9 in that the drive unit 9 drives the spindle 14 by means of a toothed belt 36 extending through the through-hole 29. In this case, the toothed belt 36 forms a transmitting part for transmitting the movement of the drive unit 9 to the spindle 14. The pinion 37 which is driven by the drive unit 9 on one side cooperates with a pinion 38 arranged on the spindle 14 on the other side.

Figure 13:
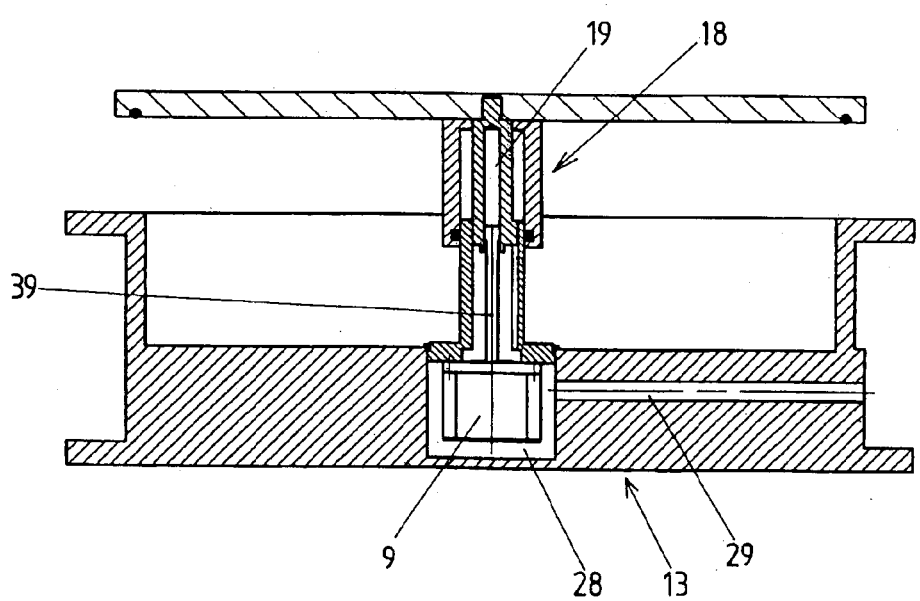
FIG. 13 shows another embodiment form of a regulating vacuum valve, according to the invention, in longitudinal central section.

In the constructional variant shown in FIG. 13, the drive unit 9 is arranged directly in the chamber 28 of the carrying unit 13. The output shaft 39 of the drive unit 9 is provided with a male thread in an area adjoining its free end, this male thread engaging with the female thread arranged in the bore hole 19 of the valve rod 18. The chamber 28 again communicates with the atmosphere via the through-hole 29.

Figure 14:
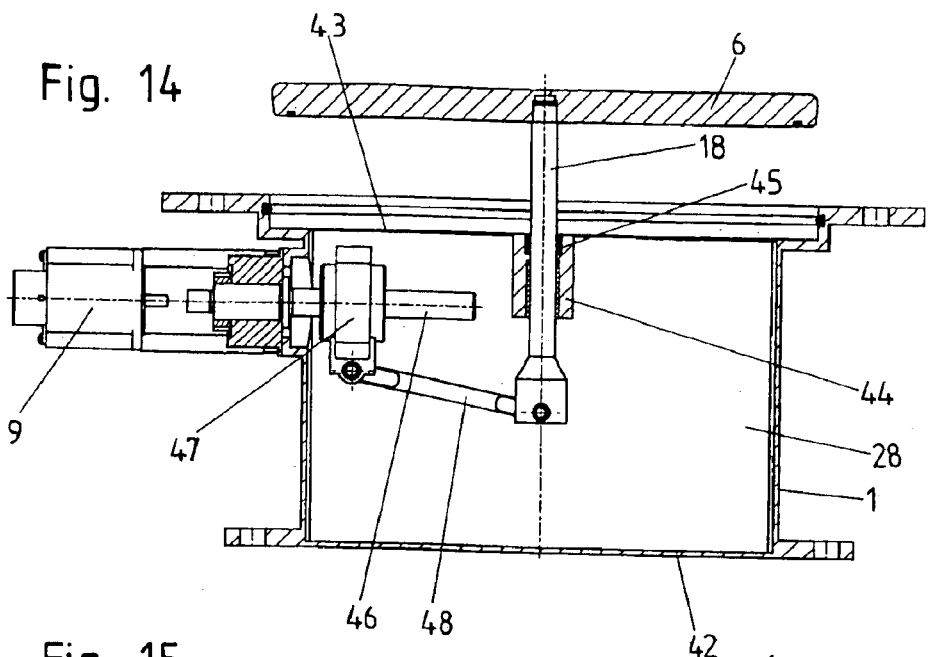
FIG. 14 shows another embodiment form of a regulating vacuum valve, according to the invention, in the completely open state of the valve (valve body, carrying unit and closure member in longitudinal central section)
Figure 15:
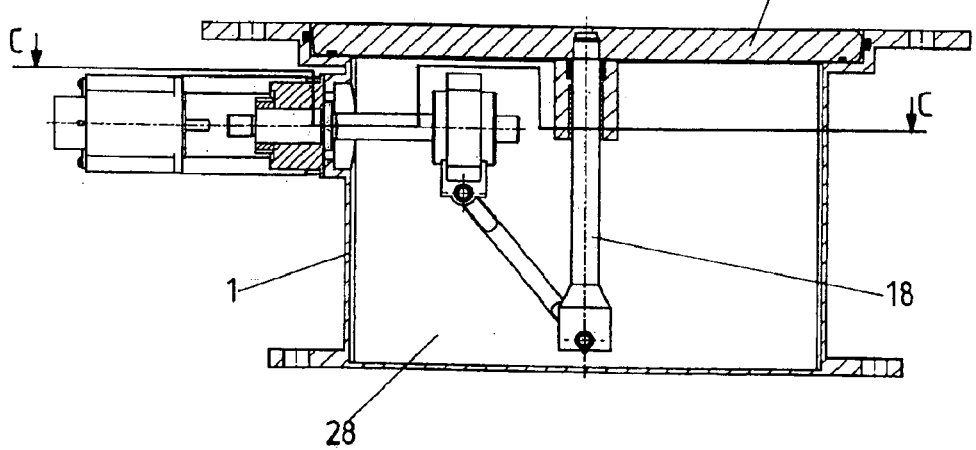
FIG. 15 shows the regulating vacuum valve from FIG. 14 in the completely closed state.
Figure 16:
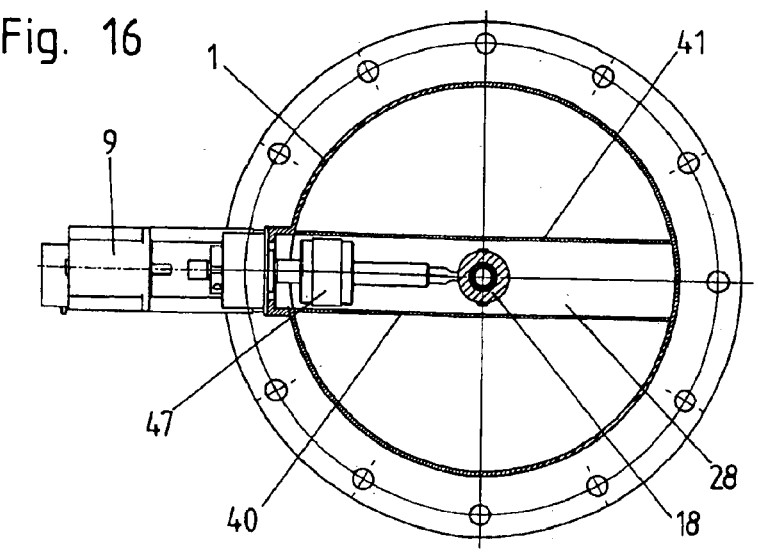
FIG. 16 shows a section along line C—C from FIG. 15.

In the embodiment example shown in FIGS. 14–16, the chamber 28 in the carrying unit 13 is defined by side walls 40, 41, a bottom wall 42 and a top wall 43. The side walls 41, 41 span the through-channel 2 through the valve body and are secured, e.g., welded, at both sides to the valve body 1, so that the chamber 28 is defined at its narrow sides by the valve body 1. A central opening is arranged in the top wall 43. This opening is continued from the interior of a guide connection piece 44 secured to the top wall 43. A sealing ring 45 which cooperates with the outer jacket surface of the valve rod is arranged at the guide connection piece 44, namely, at its inner wall. The valve rod 18 is supported in the carrying unit by the guide connection piece 44 and sealing ring 45 so as to be displaceable in axial direction and forms a sealed linear lead through for the valve rod 18.

A drive unit 9 is arranged outside the valve body 1, its output shaft 46 which is provided with an external thread projects through an opening in the valve body into the chamber 28. A nut 47 is arranged on this output shaft 46. A lever 48 is articulated at the nut 47 on one side and at the valve rod 18 in the area of its free end on the other side. When the output shaft 46 rotates, the nut 47 is displaced on it, so that the closure member 6 is displaced in the area between its completely closed position (FIG. 15) and its completely open position (FIG. 14) via the lever 48 and the valve rod 18.

Figure 17:
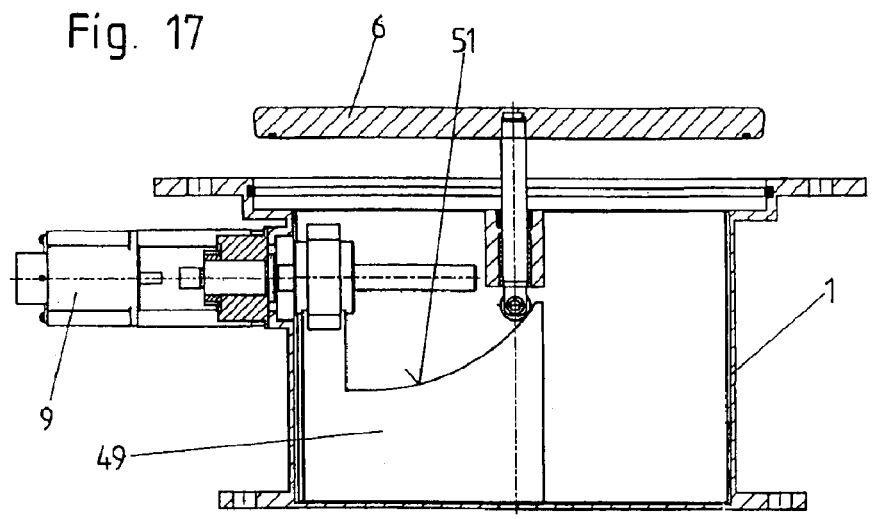
FIG. 17 shows another embodiment form of a regulating vacuum valve, according to the invention, in the completely open state (valve body, carrying unit and closure member in longitudinal central section)
Figure 18:
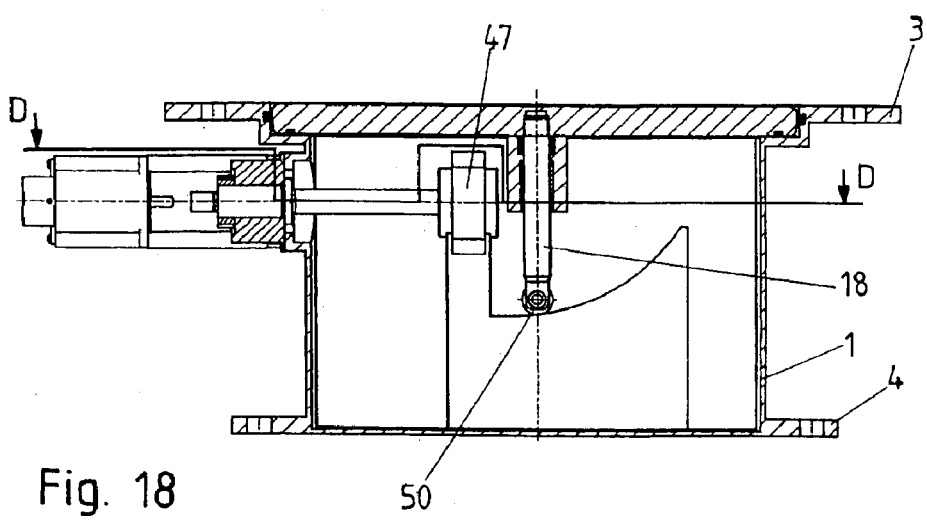
FIG. 18 shows the regulating vacuum valve from FIG. 17 in the completely closed state.
Figure 19:
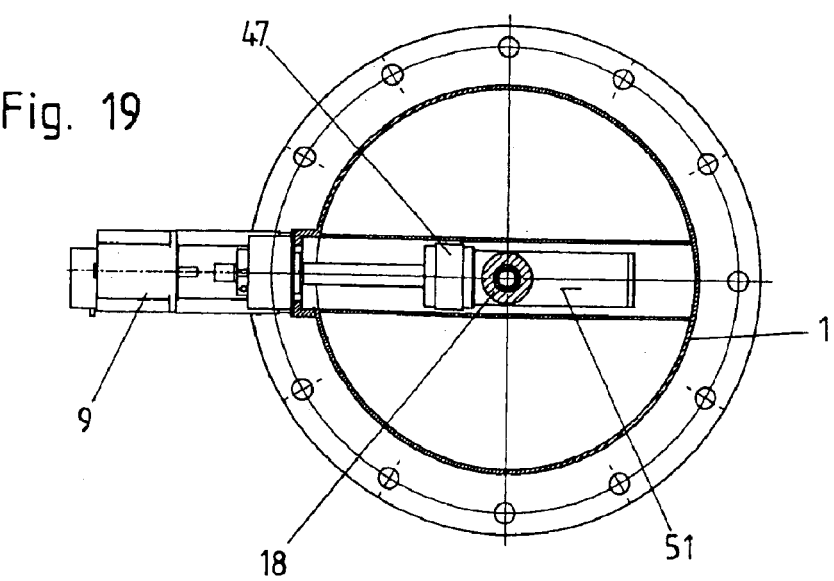
FIG. 19 shows a section along line D—D from FIG. 17.

The constructional variant shown in FIGS. 17 to 19 differs from the constructional variant shown in FIGS. 14 to 16 in that a connecting link 49 is arranged at the nut 47 instead of a lever and is carried along by the displacement of the nut 47. A roller 50 which rolls on the link surface 51 of the connecting link 49 is mounted so as to be rotatable at the free end of the valve rod. The closure member 6 is raised from the position shown in FIG. 18 to the position shown in FIG. 17 by the displacement of the connecting link 49. In the embodiment example shown in the drawing, the closure member can be lowered by the weight of the closure member 6 when the connecting link is returned to the position shown in FIG. 19. It is also conceivable and possible that the connecting link 49 has link surfaces cooperating on both sides with the roller 50

While the preceding description and the drawings depict the invention, it will be apparent to the person skilled in the art that various modifications can be carried out without departing from the true spirit and field of the invention.

| Reference Numbers: | |
|---|---|
| 1 | valve body |
| 2 | through-channel |
| 3 | annular flange |
| 4 | annular flange |
| 5 | vacuum chamber |
| 6 | closure member |
| 7 | valve seat |
| 8 | sealing ring |
| 9 | drive unit |
| 10 | output shaft |
| 11 | pinion |
| 12 | pinion |
| 13 | carrying unit |
| 14 | spindle |
| 15 | ball bearing |
| 16 | ball bearing |
| 17 | axis |
| 18 | valve rod |
| 19 | bore hole |
| 20 | recess |
| 21 | guide connection piece |
| 22 | sealing ring |
| 23 | projection |
| 24 | groove |
| 25 | carrier body |
| 26 | fastening web |
| 27 | fastening web |
| 28 | chamber |
| 29 | through-hole |
| 30 | annular flange |
| 31 | sealing ring |
| 32 | bellows |
| 33 | opening |
| 34 | edge |
| 35 | wall |
| 36 | toothed belt |
| 37 | pinion |
| 38 | pinion |
| 39 | output shaft |
| 40 | side wall |
| 41 | side wall |
| 42 | bottom wall |
| 43 | top wall |
| 44 | guide connection piece |
| 45 | sealing ring |
| 46 | output shaft |
| 47 | nut |
| 48 | lever |
| 49 | connecting link |
| 50 | roller |
| 51 | link surface |

What is claimed is:

1. A regulating vacuum valve comprising:

a valve body with a through-channel;

a closure member which is adjustable over a control path between a closed position of the regulating vacuum valve in which it contacts a valve seat and closes the through-channel and an open position of the regulating vacuum valve in which it is raised from the valve seat;

an adjusting device which has a drive unit for adjusting the closure member over the control path;

a carrying unit immovable in its entirety carries the closure member, the closure member being displaceable relative to the carrying unit;

wherein the carrying unit is arranged in the through-channel and is secured to the valve body;

wherein the carrying unit has a chamber which is sealed relative to the through-channel and in which the adjusting device or at least a portion thereof is arranged; and wherein the chamber of the carrying unit communicates with the atmosphere and is at atmospheric pressure.

2. The regulating vacuum valve according to claim 1, wherein the carrying unit comprises a carrier body and at least one fastening web for fastening the carrier body to the valve body, and a through-hole is arranged in at least one fastening web and communicates with the atmosphere and is at atmospheric pressure on one side and is connected to the chamber of the carrying unit on the other side.

3. The regulating vacuum valve according to claim 2, wherein there are at least two fastening webs which engage at different sides of the carrier body and extend in each instance between the carrier body and the valve body.

4. The regulating vacuum valve according to claim 2, wherein the carrier body is arranged centrally in the through-channel.

5. The regulating vacuum valve according to claim 1, wherein there is arranged at the closure member at least one valve rod with which an actuating part of the adjusting device cooperates.

6. The regulating vacuum valve according to claim 5, wherein the valve rod extends in axial direction of the through-channel.

7. The regulating vacuum valve according to claim 5, wherein the valve rod is supported in or at the carrying unit so as to be displaceable.

8. The regulating vacuum valve according to claim 7, wherein the closure member is fixed with respect to rotation around the axis of the valve rod relative to the carrying unit.

9. The regulating vacuum valve according to claim 7, wherein the carrying unit has a guide connection piece extending in direction of the closure member, the valve rod being supported in or at the guide connection piece so as to be displaceable.

10. The regulating vacuum valve according to claim 1, wherein the valve seat is arranged at the valve body.

11. The regulating vacuum valve according to claim 1, wherein the valve seat is flanged to the wall of a vacuum chamber to which the valve body is flanged.

12. The regulating vacuum valve according to claim 1, wherein the closure member has an elastic sealing ring which contacts a sealing surface of the valve seat in the closed position of the vacuum regulating valve.

13. The regulating vacuum valve according to claim 1, wherein the closure member is arranged inside an enlarged portion of the through-channel.

14. The regulating vacuum valve according to claim 1, wherein the closure member is plate-shaped and is displaceable vertical to its plane.

15. The regulating vacuum valve according to claim 1, wherein the through-channel penetrates the valve body in a straight line.

16. A regulating vacuum valve comprising:
a valve body with a through-channel;
a closure member which is adjustable over a control path between a closed position of the regulating vacuum valve in which it contacts a valve seat and closes the through-channel and an open position of the regulating vacuum valve in which it is raised from the valve seat;
an adjusting device which has a drive unit for adjusting the closure member over the control path;
a carrying unit which carries the closure member, the closure member being displaceable relative to the carrying unit;
wherein the carrying unit is arranged in the through-channel and is secured to the valve body; and
wherein the carrying unit has a chamber which is sealed relative to the through-channel and in which the adjusting device or at least a portion thereof is arranged,
wherein there is arranged at the closure member at least one valve rod with which an actuating part of the adjusting device cooperates,
wherein the valve rod is supported in or at the carrying unit so as to be displaceable,
wherein the carrying unit has a guide connection piece extending in direction of the closure member, the valve rod being supported in or at the guide connection piece so as to be displaceable,
wherein a sealing ring is provided for sealing the chamber in the carrying unit relative to the through-channel and seals the valve rod relative to the guide connection piece.

17. A regulating vacuum valve comprising:
a valve body with a through-channel;
a closure member which is adjustable over a control path between a closed position of the regulating vacuum valve in which it contacts a valve seat and closes the through-channel and an open position of the regulating vacuum valve in which it is raised from the valve seat;
an adjusting device which has a drive unit for adjusting the closure member over the control path; and
a carrying unit which carries the closure member, the closure member being displaceable relative to the carrying unit,
wherein the carrying unit is arranged in the through-channel and is secured to the valve body,
wherein the carrying unit has a chamber which is sealed relative to the through-channel and in which the adjusting device or at least a portion thereof is arranged,
wherein there is arranged at the closure member at least one valve rod with which an actuating part of the adjusting device cooperates,
wherein the valve rod is supported in or at the carrying unit so as to be displaceable,
wherein the carrying unit has a guide connection piece extending in direction of the closure member, the valve rod being supported in or at the guide connection piece so as to be displaceable,
wherein bellows are provided for sealing the chamber in the carrying unit relative to the through-channel of the valve body and are arranged at the carrying unit on one side and at the closure member or at the valve rod on the other side.

18. A regulating vacuum valve comprising:
a valve body with a through-channel;
a closure member which is adjustable over a control path between a closed position of the regulating vacuum valve in which it contacts a valve seat and closes the through-channel and an open position of the regulating vacuum valve in which it is raised from the valve seat;
an adjusting device which has a drive unit for adjusting the closure member over the control path; and
a carrying unit which carries the closure member, the closure member being displaceable relative to the carrying unit,
wherein the carrying unit is arranged in the through-channel and is secured to the valve body,
wherein the carrying unit has a chamber which is sealed relative to the through-channel and in which the adjusting device or at least a portion thereof is arranged,
wherein there is arranged at the closure member at least one valve rod with which an actuating part of the adjusting device cooperates,
wherein the valve rod has a bore hole which proceeds from its free end and extends in axial direction, which bore hole is a pocket hole and is provided with a female thread with which a male thread of the actuating part which can be set in rotation by the drive unit engages.

19. The regulating vacuum valve according to claim 18, wherein the actuating part is a spindle which is arranged in the chamber of the carrying unit and is supported at the carrying unit so as to be rotatable and can be driven via a transmission part by the drive unit arranged outside the valve body.

20. The regulating vacuum valve according to claim 18, wherein the actuating part is an output shaft of the drive unit arranged inside the chamber of the carrying unit.

21. A regulating vacuum valve comprising:
a valve body with a through-channel;
a closure member which is adjustable over a control path between a closed position of the regulating vacuum valve in which it contacts a valve seat and closes the through-channel and an open position of the regulating vacuum valve in which it is raised from the valve seat;
an adjusting device which has a drive unit for adjusting the closure member over the control path; and
a carrying unit which carries the closure member, the closure member being displaceable relative to the carrying unit,
wherein the carrying unit is arranged in the through-channel and is secured to the valve body,
wherein the carrying unit has a chamber which is sealed relative to the through-channel and in which the adjusting device or at least a portion thereof is arranged, wherein the closure member is arranged outside the through-channel of the valve body.

22. A regulating valve comprising:

a valve body with a through-channel;

a closure member which is adjustable over a control path between a closed position of the regulating vacuum valve in which it contacts a valve seat and closes the through-channel and an open position of the regulating vacuum valve in which it is raised from the valve seat;

wherein a sealing ring is arranged at the closure member or valve seat, which sealing ring contacts the other of these two parts in the closed position and seals the closure member relative to the valve body;

an adjusting device for adjusting the closure member over the control path, which adjusting device has a drive unit; and an immovable carrying unit which carries the closure member and is supported so as to be displaceable relative to the carrying unit, wherein the carrying unit is arranged in the through-channel and is secured to the valve body, and the carrying unit has a chamber which is sealed relative to the through-channel and in which a portion of the adjusting device is arranged, wherein the adjusting device is guided out of the valve body so as to be sealed relative to the through-channel through the carrying unit and through the valve body.

* * * * *